(12) United States Patent
Voruganti et al.

(10) Patent No.: US 12,219,350 B2
(45) Date of Patent: Feb. 4, 2025

(54) ENABLING PEER-TO-PEER AUTHENTICATION BETWEEN AT LEAST TWO MOBILE DEVICES ASSOCIATED WITH ONE OR MORE WIRELESS TELECOMMUNICATION NETWORKS

(71) Applicant: T-Mobile USA, Inc., Bellevue, WA (US)

(72) Inventors: Bhanu Prakash Voruganti, Overland Park, KS (US); Murali Malreddy, Overland Park, KS (US); Julio Costa, Tampa, FL (US); Shilpa Kowdley Srinivas, Brambleton, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 369 days.

(21) Appl. No.: 17/686,318

(22) Filed: Mar. 3, 2022

(65) Prior Publication Data
US 2023/0284012 A1    Sep. 7, 2023

(51) Int. Cl.
*H04M 1/66* (2006.01)
*H04M 1/68* (2006.01)
(Continued)

(52) U.S. Cl.
CPC ............ *H04W 12/06* (2013.01); *H04W 8/20* (2013.01); *H04W 12/0471* (2021.01);
(Continued)

(58) Field of Classification Search
CPC ... H04W 12/06; H04W 8/20; H04W 12/0471; H04W 12/40; H04W 76/10;
(Continued)

(56) References Cited

U.S. PATENT DOCUMENTS 6,064,875 A * 5/2000 Morgan ............ H04W 12/0431
455/433
7,136,651 B2    11/2006 Kalavade
(Continued)

FOREIGN PATENT DOCUMENTS

| CN | 101889458 B | 1/2016 |
|---|---|---|
| CN | 105850176 A | 8/2016 |

(Continued)

*Primary Examiner* — Stephen M D Agosta
(74) *Attorney, Agent, or Firm* — Perkins Coie LLP

(57) ABSTRACT

A first UE can receive a request to communicate from a second UE. The first UE and the second UE can exchange a first cryptographic key and a second cryptographic key associated with the first and the second UE, respectively. The first UE can receive an encrypted unique identifier associated with the second UE, where the unique identifier identifies a second wireless telecommunication network serving the second UE. The first UE can authenticate the second UE by sending the encrypted unique identifier to a first wireless telecommunication network and sending a request to confirm that the unique identifier is valid. The first UE can receive, from the first wireless telecommunication network, a confirmation that the unique identifier is valid. Upon receiving the confirmation, the first UE can engage in a communication with the second UE.

13 Claims, 7 Drawing Sheets

(51) Int. Cl.
  *H04M 3/16* (2006.01)
  *H04W 8/20* (2009.01)
  *H04W 12/0471* (2021.01)
  *H04W 12/06* (2021.01)
  *H04W 12/40* (2021.01)
  *H04W 76/10* (2018.01)
  *H04W 84/04* (2009.01)
  *H04W 84/12* (2009.01)

(52) U.S. Cl.
  CPC ........... *H04W 12/40* (2021.01); *H04W 76/10* (2018.02); *H04W 84/042* (2013.01); *H04W 84/12* (2013.01)

(58) Field of Classification Search
  CPC ... H04W 84/042; H04W 84/12; H04W 12/04; H04W 12/069
  See application file for complete search history.

(56) References Cited

U.S. PATENT DOCUMENTS

| | | | |
|---|---|---|---|
| 7,302,229 B2 | 11/2007 | Riddles | |
| 7,444,513 B2 | 10/2008 | Nyman et al. | |
| 7,640,008 B2 | 12/2009 | Gallagher et al. | |
| 7,738,868 B2 | 6/2010 | Bajar et al. | |
| 7,831,245 B1 | 11/2010 | Lekutai | |
| 7,941,144 B2 | 5/2011 | Nylander et al. | |
| 7,962,152 B2 | 6/2011 | Buerger et al. | |
| 8,189,548 B2 | 5/2012 | Caldwell et al. | |
| 8,219,811 B2 | 7/2012 | Roundtree | |
| 8,306,518 B1 | 11/2012 | Gailloux et al. | |
| 8,351,420 B2 | 1/2013 | Linkola et al. | |
| 8,503,358 B2 | 8/2013 | Hanson et al. | |
| 8,526,360 B1 | 9/2013 | Breau et al. | |
| 8,577,414 B2 | 11/2013 | Rajadurai et al. | |
| 8,594,632 B1* | 11/2013 | Azizi | H04W 12/06 715/752 |
| 8,688,103 B2 | 4/2014 | Doshi | |
| 8,730,914 B2 | 5/2014 | Souissi | |
| 8,774,766 B2 | 7/2014 | Ding | |
| 8,781,479 B2 | 7/2014 | Mao et al. | |
| 8,867,490 B1 | 10/2014 | Krishna et al. | |
| 8,924,715 B2 | 12/2014 | Schell et al. | |
| 9,002,319 B2 | 4/2015 | Cloutier | |
| 9,008,063 B2 | 4/2015 | Cui et al. | |
| 9,083,680 B2 | 7/2015 | Marsico | |
| 9,198,024 B1 | 11/2015 | Khalid et al. | |
| 9,264,898 B2 | 2/2016 | Schroeder et al. | |
| 9,408,246 B2 | 8/2016 | Muley et al. | |
| 9,591,677 B2 | 3/2017 | Zhang | |
| 9,609,510 B2 | 3/2017 | Raleigh et al. | |
| 9,661,544 B2 | 5/2017 | Jamadagni et al. | |
| 9,693,189 B2 | 6/2017 | Caldwell et al. | |
| 9,716,999 B2 | 7/2017 | Zhang et al. | |
| 9,717,088 B2 | 7/2017 | Reisslein et al. | |
| 9,729,997 B2 | 8/2017 | Chen et al. | |
| 9,736,689 B2 | 8/2017 | Liu et al. | |
| 9,763,168 B1 | 9/2017 | Zait et al. | |
| 9,813,976 B2* | 11/2017 | Velusamy | H04M 15/885 |
| 9,826,453 B2 | 11/2017 | Linkola et al. | |
| 9,838,991 B1 | 12/2017 | Campbell et al. | |
| 9,846,911 B1 | 12/2017 | Burks et al. | |
| 9,854,440 B2* | 12/2017 | De Froment | H04W 76/10 |
| 9,923,764 B2 | 3/2018 | Garg et al. | |
| 9,924,347 B1 | 3/2018 | Chastain et al. | |
| 9,955,494 B2 | 4/2018 | Soliman et al. | |
| 9,961,588 B2 | 5/2018 | Nambi Raj et al. | |
| 10,015,764 B2 | 7/2018 | Chastain et al. | |
| 10,028,121 B2 | 7/2018 | Artuso | |
| 10,225,746 B2 | 3/2019 | Mohammed et al. | |
| 10,231,151 B2 | 3/2019 | Cao et al. | |
| 10,250,383 B1* | 4/2019 | Kumar | H04W 4/06 |
| 10,637,996 B2 | 4/2020 | Kwok | |
| 10,652,746 B2 | 5/2020 | Engan et al. | |
| 10,674,422 B2 | 6/2020 | Cao et al. | |
| 10,701,310 B2 | 6/2020 | Pandey et al. | |
| 10,715,996 B1 | 7/2020 | Singh et al. | |
| 10,743,180 B2 | 8/2020 | Huang | |
| 10,805,768 B2 | 10/2020 | Lee et al. | |
| 10,812,975 B1 | 10/2020 | Easwar Prasad et al. | |
| 10,826,945 B1 | 11/2020 | Xu et al. | |
| 10,833,876 B2 | 11/2020 | Malthankar et al. | |
| 10,911,414 B2 | 2/2021 | Cassel | |
| 10,952,124 B1 | 3/2021 | Bailey et al. | |
| 11,044,597 B2 | 6/2021 | Wong et al. | |
| 11,134,423 B2 | 9/2021 | Martin | |
| 11,184,356 B1 | 11/2021 | Tandon et al. | |
| 11,184,479 B2 | 11/2021 | Singh et al. | |
| 11,196,798 B2 | 12/2021 | Li et al. | |
| 11,206,535 B1 | 12/2021 | Finger | |
| 11,212,670 B2 | 12/2021 | Wang et al. | |
| 12,095,690 B2* | 9/2024 | Xiong | H04W 72/0453 |
| 2002/0025042 A1* | 2/2002 | Saito | H04W 12/04 380/258 |
| 2004/0034776 A1* | 2/2004 | Fernando | H04L 9/321 713/171 |
| 2005/0064855 A1 | 3/2005 | Russell | |
| 2005/0233733 A1 | 10/2005 | Roundtree et al. | |
| 2006/0174009 A1 | 8/2006 | Martiquet et al. | |
| 2006/0276226 A1* | 12/2006 | Jiang | H04W 8/183 455/433 |
| 2008/0052765 A1* | 2/2008 | Shinomiya | G06F 21/41 713/168 |
| 2008/0076412 A1 | 3/2008 | Khetawat et al. | |
| 2008/0130564 A1 | 6/2008 | Gallagher et al. | |
| 2009/0318124 A1 | 12/2009 | Haughn | |
| 2010/0026816 A1 | 2/2010 | Bergstrom et al. | |
| 2010/0220856 A1* | 9/2010 | Kruys | H04L 9/321 380/270 |
| 2011/0014923 A1 | 1/2011 | Krco et al. | |
| 2011/0258327 A1* | 10/2011 | Phan | H04W 76/14 709/227 |
| 2013/0095753 A1* | 4/2013 | Chen | H04W 76/10 455/41.1 |
| 2013/0111038 A1* | 5/2013 | Girard | H04L 69/16 709/226 |
| 2013/0137373 A1* | 5/2013 | Choi | H04W 12/062 455/41.1 |
| 2013/0150051 A1* | 6/2013 | Van Phan | H04W 36/03 455/437 |
| 2013/0223280 A1* | 8/2013 | Choi | H04W 4/06 370/254 |
| 2013/0282589 A1* | 10/2013 | Shoup | G06F 21/34 726/5 |
| 2013/0303223 A1* | 11/2013 | Patil | H04W 8/005 455/517 |
| 2014/0068023 A1* | 3/2014 | Arickan | H04L 61/5014 709/220 |
| 2014/0112194 A1* | 4/2014 | Novlan | H04W 76/14 370/254 |
| 2014/0189808 A1* | 7/2014 | Mahaffey | G06F 21/6245 726/4 |
| 2015/0195261 A1* | 7/2015 | Gehrmann | H04L 9/0833 726/7 |
| 2015/0195760 A1 | 7/2015 | Sanz et al. | |
| 2015/0327065 A1 | 11/2015 | Mildh et al. | |
| 2016/0142214 A1* | 5/2016 | Ekberg | H04L 9/3263 713/175 |
| 2017/0208463 A1* | 7/2017 | Brand | H04W 12/06 |
| 2017/0273120 A1 | 9/2017 | Xiang | |
| 2017/0331678 A1 | 11/2017 | Olsson et al. | |
| 2018/0130347 A1* | 5/2018 | Ricci | B60R 25/305 |
| 2018/0152824 A1 | 5/2018 | Baker et al. | |
| 2018/0324548 A1* | 11/2018 | Venkatraman | H04W 76/14 |
| 2019/0215879 A1* | 7/2019 | Song | G10L 15/22 |
| 2019/0222979 A1* | 7/2019 | Hahn | H04W 76/27 |
| 2020/0045664 A1* | 2/2020 | Choi | H04W 4/40 |
| 2020/0045697 A1* | 2/2020 | Choi | H04W 72/0446 |
| 2020/0053704 A1* | 2/2020 | Kim | H04W 74/006 |
| 2020/0077380 A1* | 3/2020 | Hahn | H04W 72/51 |
| 2020/0336891 A1 | 10/2020 | Guo et al. | |
| 2020/0344055 A1* | 10/2020 | Topps | H04L 9/0822 |

(56) References Cited

U.S. PATENT DOCUMENTS

| | | |
|---|---|---|
| 2021/0037604 A1 | 2/2021 | Malthankar et al. |
| 2021/0368547 A1 | 11/2021 | Kadiri et al. |
| 2022/0014908 A1 | 1/2022 | Finger |

FOREIGN PATENT DOCUMENTS

| | | |
|---|---|---|
| CN | 106068016 A | 11/2016 |
| CN | 106131893 A | 11/2016 |
| CN | 102640525 B | 12/2016 |
| CN | 106465111 A | 2/2017 |
| CN | 106465179 A | 2/2017 |
| CN | 103460756 B | 5/2017 |
| CN | 104081867 B | 4/2018 |
| CN | 107925875 A | 4/2018 |
| CN | 108702628 A | 10/2018 |
| CN | 104205936 B | 11/2018 |
| CN | 108781359 A | 11/2018 |
| CN | 104980991 B | 6/2019 |
| CN | 105723757 B | 6/2019 |
| CN | 106416312 B | 2/2020 |
| CN | 113038627 A | 6/2021 |
| DE | 202006010953 U1 | 12/2006 |
| EP | 1315394 A2 | 5/2003 |
| EP | 1952565 A1 | 8/2008 |
| EP | 2168391 A1 | 3/2010 |
| EP | 2858395 A1 | 4/2015 |
| EP | 2582115 B1 | 12/2015 |
| EP | 2981147 A1 | 2/2016 |
| EP | 2862331 B1 | 10/2016 |
| EP | 2995118 B1 | 3/2017 |
| EP | 3266233 A1 | 1/2018 |
| EP | 2337312 B1 | 3/2018 |
| EP | 3158827 B1 | 5/2018 |
| EP | 2761969 B1 | 7/2018 |
| EP | 3398373 A1 | 11/2018 |
| EP | 2958043 B1 | 1/2019 |
| EP | 3029997 B1 | 8/2019 |
| EP | 3213545 B1 | 10/2019 |
| EP | 2848044 B1 | 11/2019 |
| EP | 3160176 B1 | 12/2019 |
| EP | 3679744 A1 | 7/2020 |
| EP | 3739529 A1 | 11/2020 |
| EP | 3466134 B1 | 11/2021 |
| EP | 2443871 B1 | 12/2021 |
| JP | 2008515282 A | 5/2008 |
| JP | 5670461 B2 | 12/2014 |
| JP | 6010637 B2 | 9/2016 |
| JP | 2016526812 A | 9/2016 |
| JP | 6060310 B2 | 12/2016 |
| JP | 3217133 U | 6/2018 |
| JP | 6571189 B2 | 8/2019 |
| JP | 2021501504 A | 1/2021 |
| JP | 6833837 B2 | 2/2021 |
| KR | 100642459 B1 | 11/2006 |
| KR | 100762644 B1 | 10/2007 |
| KR | 20110017520 A | 2/2011 |
| KR | 101078639 B1 | 11/2011 |
| KR | 101129246 B1 | 3/2012 |
| KR | 20120028706 A | 3/2012 |
| KR | 101184722 B1 | 9/2012 |
| KR | 101486740 B1 | 2/2015 |
| KR | 101569364 B1 | 11/2015 |
| KR | 20160014843 A | 2/2016 |
| KR | 101631630 B1 | 6/2016 |
| KR | 101826829 B1 | 2/2018 |
| KR | 20210010867 A | 1/2021 |
| KR | 102315881 B1 | 10/2021 |
| WO | 2005114912 A1 | 12/2005 |
| WO | 2005125163 A1 | 12/2005 |
| WO | 2010102149 A2 | 9/2010 |
| WO | 2012041219 A1 | 4/2012 |
| WO | 2014032234 A1 | 3/2014 |
| WO | 2014032549 A1 | 3/2014 |
| WO | 2015027892 A1 | 3/2015 |
| WO | 2016001032 A1 | 1/2016 |
| WO | 2016001035 A1 | 1/2016 |
| WO | 2016065696 A1 | 5/2016 |
| WO | 2016076628 A2 | 5/2016 |
| WO | 2016112774 A1 | 7/2016 |
| WO | 2016154902 A1 | 10/2016 |
| WO | 2017162295 A1 | 9/2017 |
| WO | 2018016713 A2 | 1/2018 |
| WO | 2018030349 A1 | 2/2018 |
| WO | 2018045805 A1 | 3/2018 |
| WO | 2018049881 A1 | 3/2018 |
| WO | 2018182897 A1 | 10/2018 |
| WO | 2019184859 A1 | 10/2019 |
| WO | 2020126271 A1 | 6/2020 |
| WO | 2020127455 A1 | 6/2020 |
| WO | 2020128455 A2 | 6/2020 |
| WO | 2020225536 A1 | 11/2020 |
| WO | 2020250548 A1 | 12/2020 |
| WO | 2021038443 A1 | 3/2021 |
| WO | 2021204381 A1 | 10/2021 |
| WO | 2021219102 A1 | 11/2021 |
| WO | 2021228374 A1 | 11/2021 |
| WO | 2021239895 A1 | 12/2021 |

\* cited by examiner

ENABLING PEER-TO-PEER AUTHENTICATION BETWEEN AT LEAST TWO MOBILE DEVICES ASSOCIATED WITH ONE OR MORE WIRELESS TELECOMMUNICATION NETWORKS

BACKGROUND

Peer-to-peer authentication blocks a remote computer from connecting to a client computer until the client computer has authenticated that remote computer. Currently there is no standardized authentication system for peer-to-peer authentication. To perform peer-to-peer sharing, the two devices need to register with a third-party platform, such as Google or Facebook, that authenticates them, before the devices can proceed to communicate with each other.

BRIEF DESCRIPTION OF THE DRAWINGS

Detailed descriptions of implementations of the present invention will be described and explained through the use of the accompanying drawings.

Figure 1:
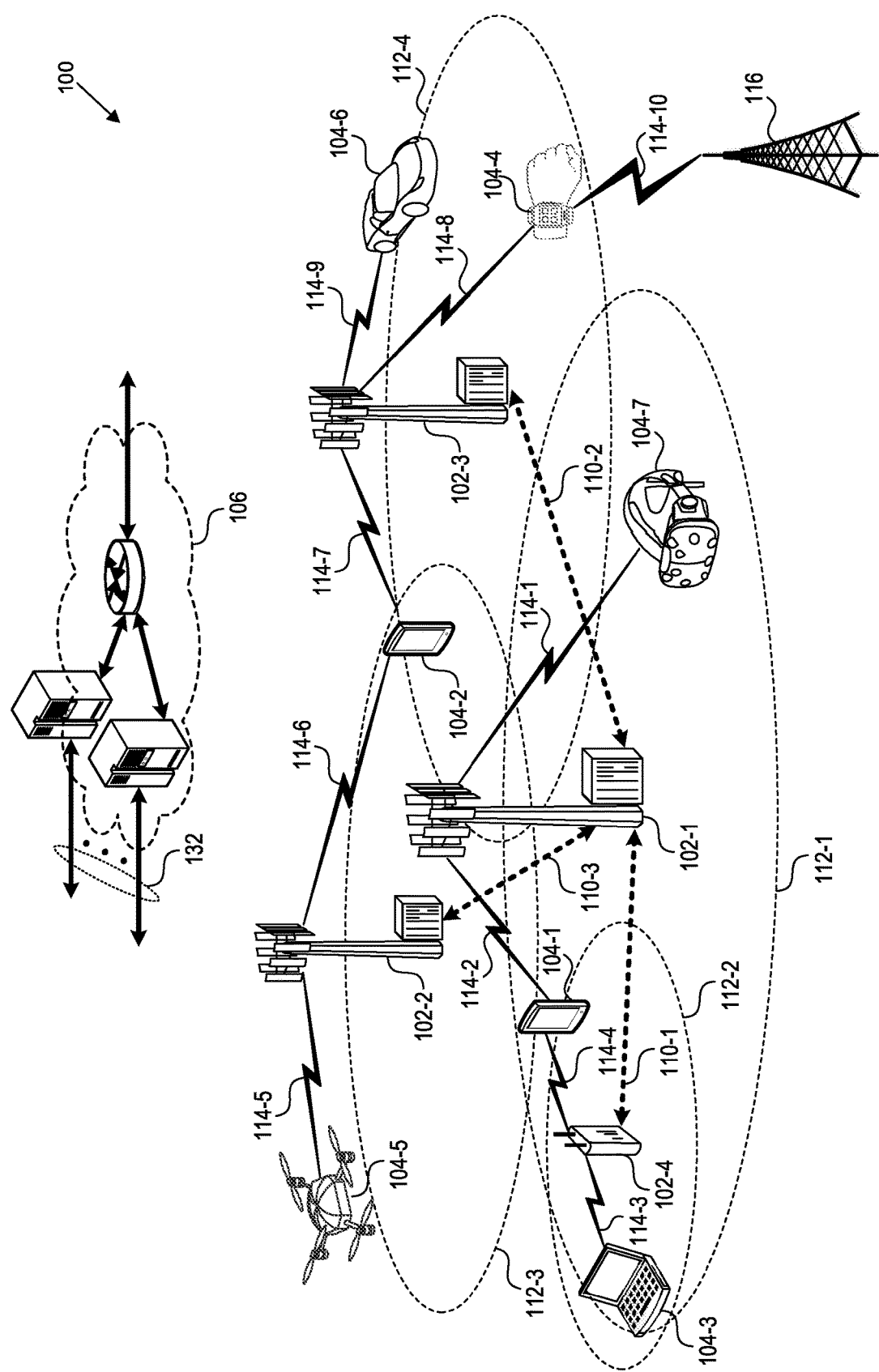
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to enable peer-to-peer authentication between at least two mobile devices, A and B, associated with one or more wireless telecommunication networks without requiring the mobile devices A and B to register with a third-party platform that can perform the authentication. The mobile device A can receive a request to communicate from the mobile device B. The two mobile devices A, B can exchange cryptographic keys A, B corresponding to the two mobile devices, respectively.

Mobile device A can receive an encrypted international mobile subscriber identity (IMSI) associated with mobile device B. The IMSI is unique to mobile device B, and identifies a wireless telecommunication network ("network") B serving the mobile device B. Mobile device A can authenticate mobile device B by sending the encrypted IMSI to a network A serving mobile device A and sending a request to confirm that the IMSI is valid. The network A can be the same as or different from the network B.

The network A can extract a unique identifier of the network B from the IMSI, as well as a unique identifier of the mobile device B. Network A can ask network B whether the unique identifier of the mobile device B is a valid identifier associated with network B. Network B can confirm whether the unique identifier of the mobile device B is valid. If the unique identifier of the mobile device B is valid, mobile device A can receive, from the network A, a confirmation that the IMSI is valid. Upon receiving the confirmation, mobile device A can engage in a communication with mobile device B. While the present system is described as using IMS's, other unique identifiers for the mobile devices can be used. The system implicitly relies on the fact that there is some level of trust already between the networks A and B. Usually, all the carriers should be able to roam across each other's network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
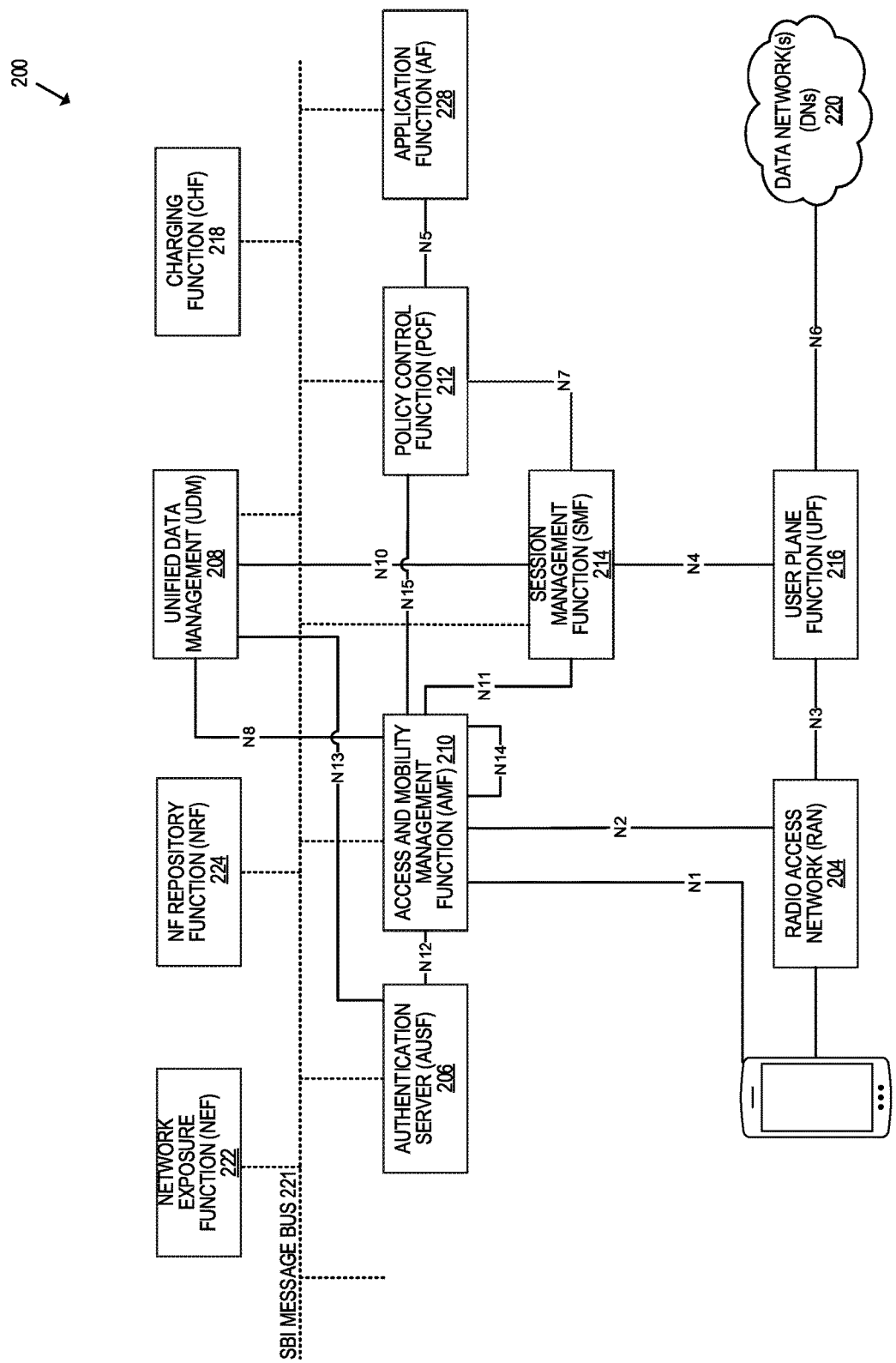
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a random access network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service (QoS) and charging rules, includes network slice selection, which is regulated by the NSSF 226.

Figure 3:
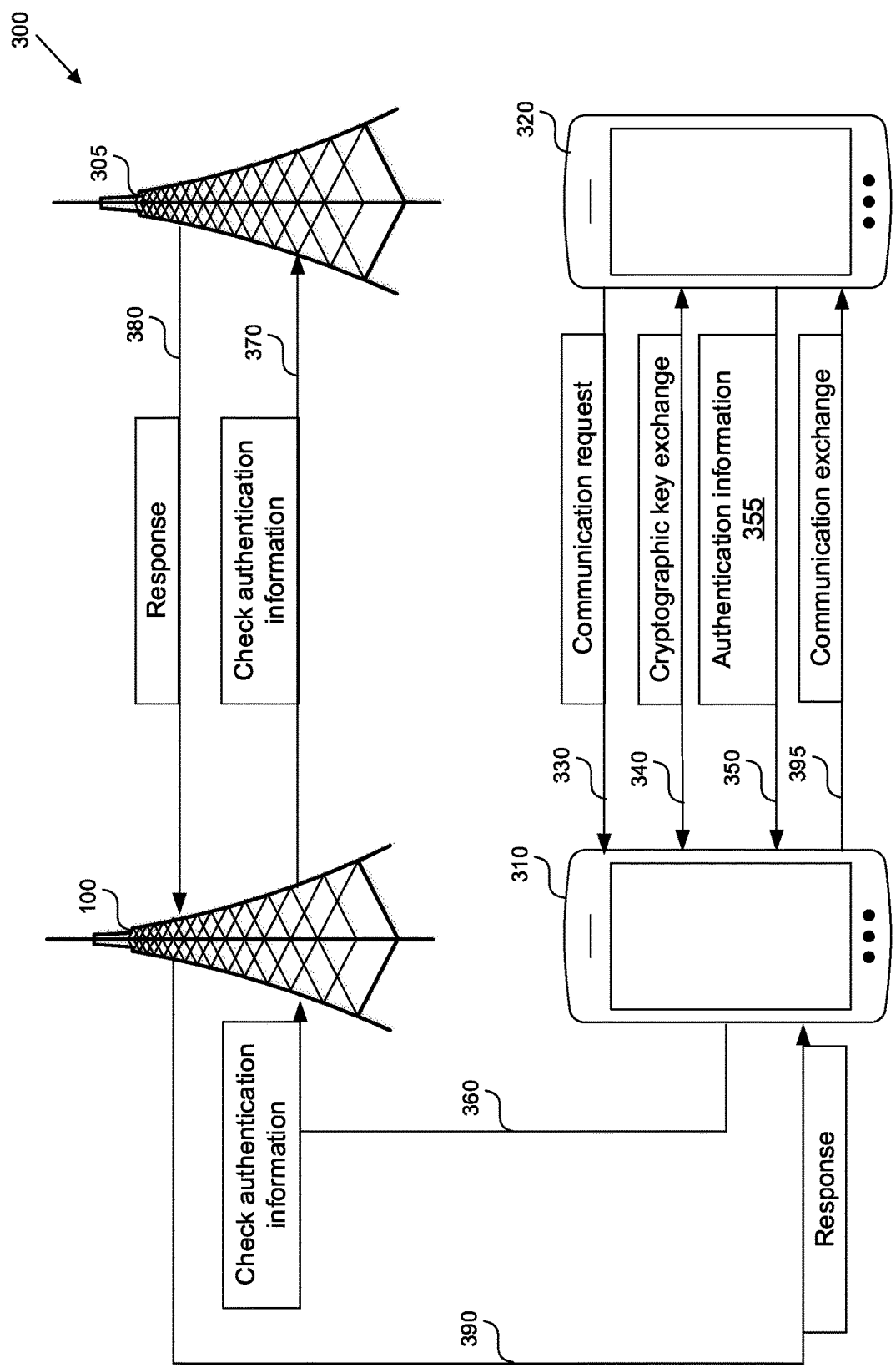
FIG. 3 shows a process performing peer-to-peer authentication.

Enabling Peer-to-Peer Authentication Between at Least Two Mobile Devices Associated with One or More Wireless Telecommunication Networks FIG. 3 shows a process performing peer-to-peer authentication. With existing technology, the mobile devices or user equipment (UE), prior to engaging in communication, have to authenticate themselves with a third-party platform, such as Google, Facebook, BitTorrent, etc. By contrast, the system 300 enables two UEs 310, 320 to engage in peer-to-peer communication, for example, to share a file, exchange crypto currency, extend network coverage, etc., without subscribing to a third-party platform and using the third-party platform for authentication. The system 300 enables UEs 310, 320 to authenticate each other using the network 100. The UEs can be mobile devices, vehicles, drones, unmanned vehicles, autonomous vehicles, etc.

In step 330, the UE 320 can request to engage in peer-to-peer communication with the UE 310. In response, the UE 310, in step 340, can request to exchange cryptographic keys between the two UEs 310, 320. The cryptographic key exchange can be done according to Extensible Authentication Protocol (EAP). The cryptographic protocols that can be used are EAP-AKA or EAP-AKA' which are currently used to authenticate to 4G/5G networks. The temporary cryptographic keys can be computed based on the SIM card.

EAP is an authentication framework frequently used in network and internet connections. It is defined in Request for Comments (RFC) 3748, and is updated by RFC 5247. EAP is an authentication framework for providing the transport and usage of material and parameters generated by EAP methods. The EAP authentication framework can generate cryptographic keys to be used in communication between the UEs 310, 320.

In step 350, upon completing the cryptographic key exchange, the UE 310 can receive authentication information from the UE 320. The authentication information 355 can include a unique identifier associated with the UE 320 and can be encrypted using the cryptographic keys exchanged in step 340. The unique identifier can be an international mobile subscriber identity (IMSI) associated with the subscriber identity module (SIM) card of the UE 320.

The network 100 can connect mobile phone calls and communicate with UEs 310, 320 using their IMSIs. IMSI 355 conforms to a predetermined format. The first three digits represent the mobile country code (MCC). The next two or three digits represent the mobile network code (MNC). Three-digit MNC codes are allowed by E.212, a second-generation number plan, but are mainly used in the United States and Canada. The length of the MNC depends on the value of the MCC, and it is recommended that the length is uniform within an MCC area. The next digits represent the mobile subscriber identification number (MSIN). Normally there are 10 digits, but there can be fewer in the case of a three-digit MNC or if national regulations indicate that the total length of the IMSI should be less than 15 digits. Digits are different from country to country.

In step 360, the UE 310 sends a request to check authentication information including the unique identifier 355 to the network 100 associated with the UE 310. Based on the received IMSI 355, the network 100 can identify the wireless telecommunication network 305 of the UE 320 using the MNC contained in the IMSI. Additionally, the network 100 can identify the MSIN from the IMSI 355, where the MSIN is unique to the UE 320. The network 305 can be the same as network 100, or can be a different wireless telecommunication network.

If the network 305 is the same as the network 100, the network 100 can verify that the MSIN is a valid number associated with the network 100. If the network 305 is different from the network 100, the network 100, in step 370, can send the request to the network 305 to check authentication information by, for example, validating that the MSIN is a valid number associated with the network 305. In step 380, the network 305 can send a response confirming that the MSIN is valid, or denying that the MSIN is valid.

The network 100, in step 390, can forward the received response to the UE 310, indicating that the authentication information 355 is valid, or not valid. If the response indicates that the authentication information 355 is valid, then the UE 310, in step 395, can exchange information with the UE 320.

Figure 4:
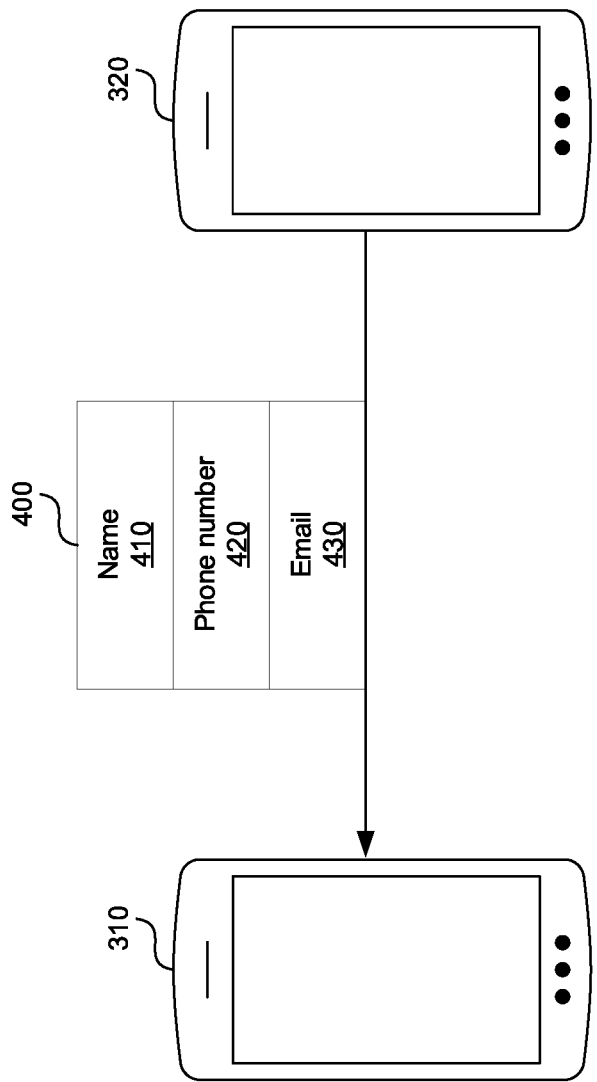
FIG. 4 shows authentication information that can be exchanged between two devices.

FIG. 4 shows authentication information that can be exchanged between two devices. In addition to exchanging authentication information 355, the UE 310 can further increase the accuracy of authentication by requesting additional information 400 from the UE 320. The additional information can include name 410 of the user of the UE 320, phone number 420 of the user of the UE 320, email 430 of the user of the UE 320, etc. The UE 310 can request one or more of the additional pieces of information. The higher the amount of additional information requested, the higher the accuracy of authentication. If UE 320 sends the consent to network 305 in FIG. 3 to share the additional information, the network 305 can answer UE's 310 request to confirm additional authentication factors such as name or phone number or address of UE 320.

Once the UE 310 receives the additional information 400, the UE 310 can send the additional information to the network 100 in FIGS. 1, 3, and request that the network 100 verify that the additional information 400 is associated with the authentication information 355.

Figure 5:
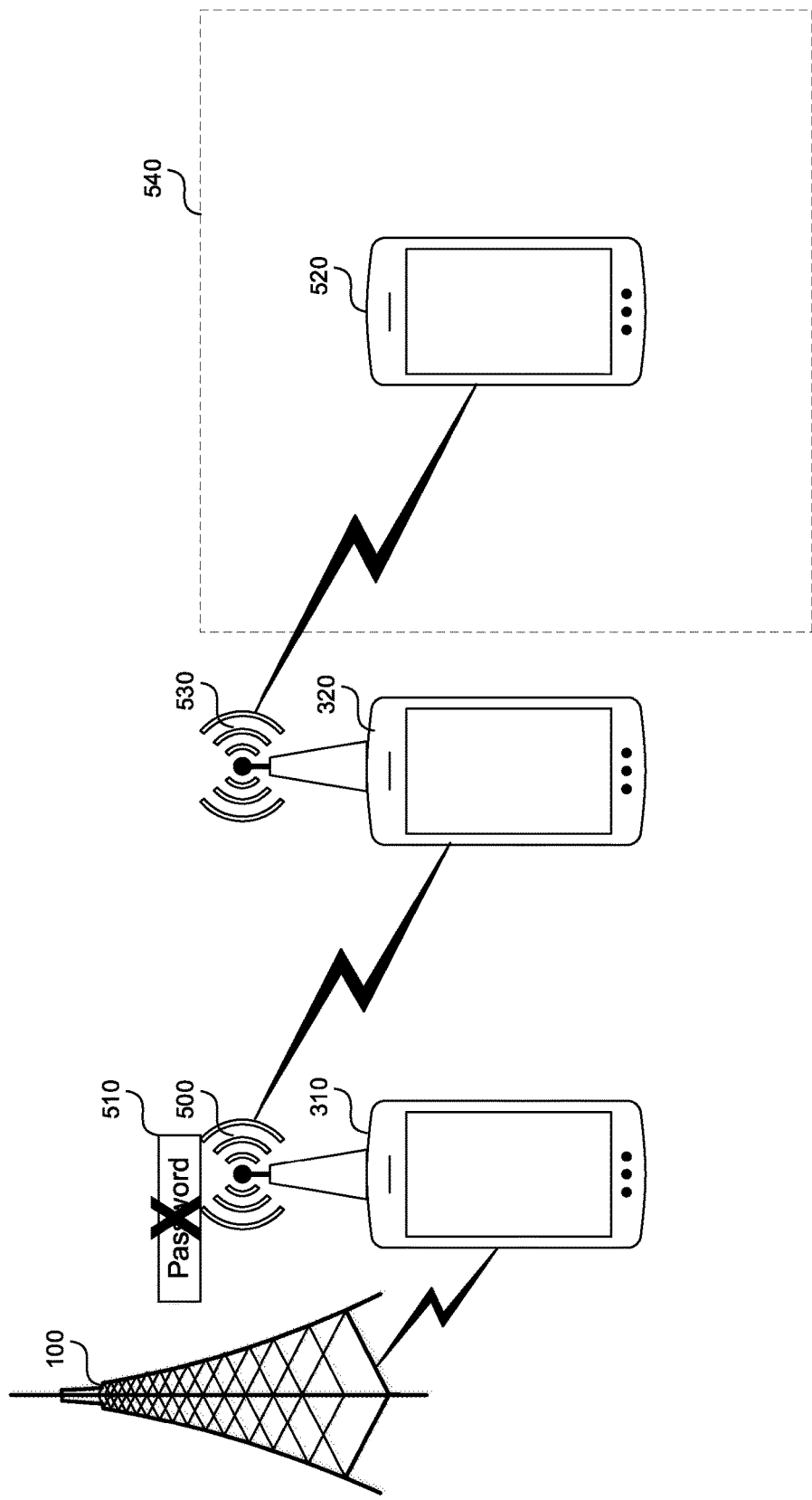
FIG. 5 shows an example use of the system.

FIG. 5 shows an example use of the system. The described system 300 in FIG. 3 can be used in various contexts, such as content sharing, extension of cellular or Wi-Fi coverage, fraud prevention, crypto currency exchange, etc.

For example, crypto currency does not have any central banking or regulated system. Currently, to exchange crypto currencies, the UEs 310, 320 have to sign up with one of the coin exchanges, which can take three to five days to validate. The system presented in this application reduces the verification time to a matter of seconds.

The system 300 can create an access point 500, e.g., a hotspot 500, such as a Wi-Fi hotspot. Currently, for the UE 310 to create a Wi-Fi hotspot, the UE 310 generates a static Wi-Fi password, which needs to be communicated to the UE 320 before the UE 320 can connect to the Wi-Fi hotspot 500. Using the system 300, the UE 310 can create a Wi-Fi hotspot 500, and can authenticate the UE 320 as described in this application, without requiring the UE 320 to provide the Wi-Fi password 510.

Consequently, the UE 310 can extend coverage of the cellular connection provided to the UE 310 to other authenticated UEs 320. For example, the network 100 providing coverage to the UE 310 can be a 5G network. The UE 320 may not be a 5G device, however by using the peer-to-peer authentication described in this application, that UE 320 can connect to the Wi-Fi hotspot 500, and have access to the 5G network 100.

In addition, cellular or Wi-Fi coverage can be effectively extended by daisy chaining, e.g., creating a sequence, of authenticated devices. For example, in hazardous situations, such as a fire, earthquake, or other situations involving loss of Wi-Fi or cellular coverage, the UE 310 can generate a Wi-Fi hotspot 500 for the UE 320 that is within 20 meters of the UE 310, thus extending the coverage of the network 100 associated with that UE 310 by 20 m. Next, the UE 320 can generate another Wi-Fi hotspot 530, extending the coverage of the network 100 another 20 m. Consequently, the UE 520, which is in an area 540 that has no cellular or Wi-Fi coverage, such as in a burning building, can connect to the Wi-Fi hotspot 530, and consequently to the network 100 associated with the UE 310. The daisy chain can include an arbitrary number of devices such as three, four, five, 10, etc.

In addition to daisy chaining, the system can also support a one-to-many connection. For example, the UE 310 can provide the Wi-Fi hotspot 500 to which UEs 320, 520 can directly connect.

Another feature of 5G networks is that the 5G network 100 can be a private network. Private networks can be provided to a predetermined group of users, such as employees of Amazon. Using Wi-Fi hotspots and daisy chaining, as described in this application, the private 5G network can be extended to provide coverage for the devices that are outside of the 5G private network.

Another use for the disclosed technology can be vehicle-to-vehicle communications. For example, the UEs 310, 320 can be vehicles connected to the network 100. The vehicles 310, 320 can authenticate each other, as described in this application, and can communicate with each other to coordinate driving directions, speed, changes to the speed and direction of motion, etc., thus avoiding collisions.

Figure 6:
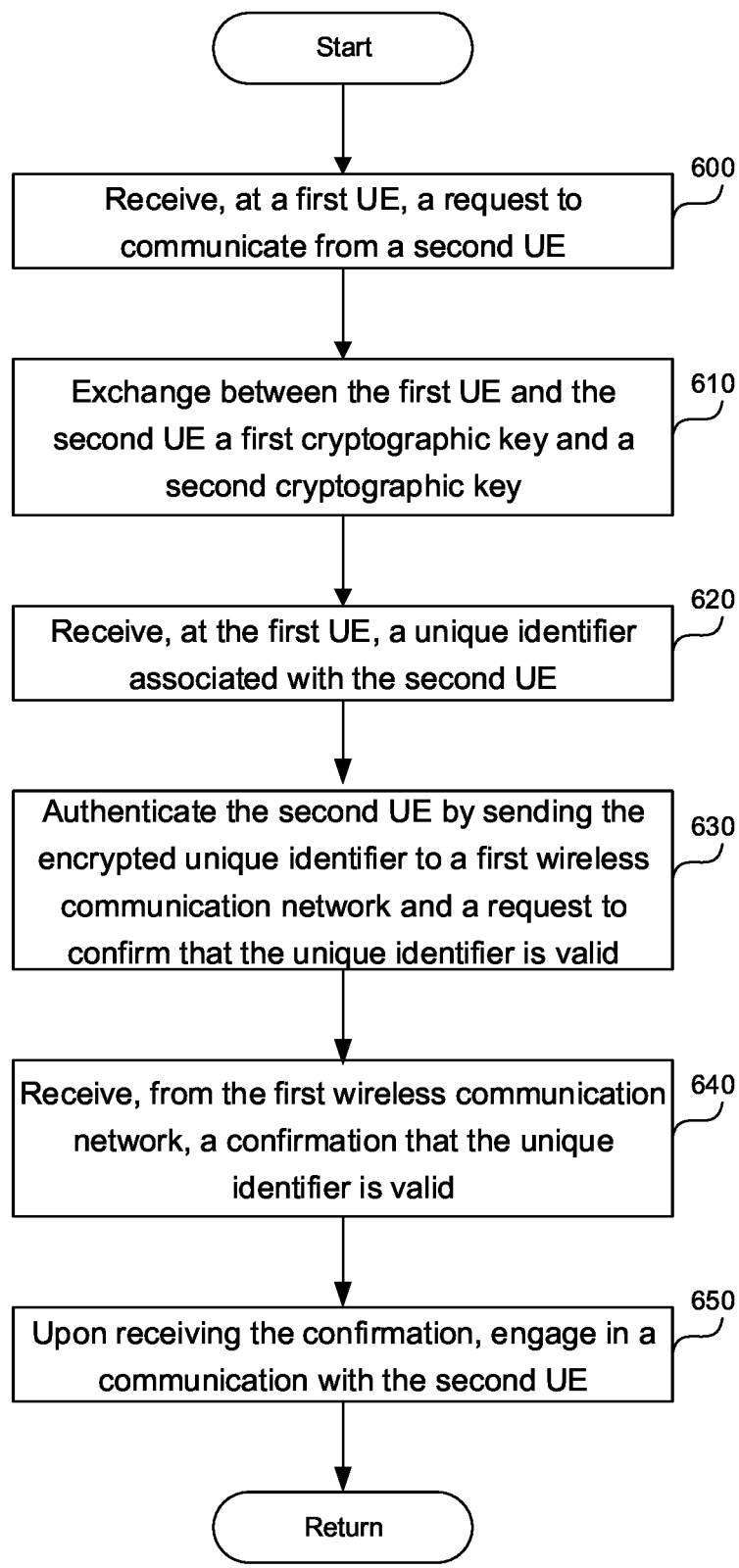
FIG. 6 is a flowchart of a method to enable peer-to-peer authentication between at least two UEs associated with one or more wireless telecommunication networks.

FIG. 6 is a flowchart of a method to enable peer-to-peer authentication between at least two UEs associated with one or more wireless telecommunication networks. A hardware or software processor executing instructions described in this application can be associated with either the network 100 in FIG. 1, or UEs 310, 320 in FIGS. 3-5. In step 600, the processor can receive, at a first UE, a request to communicate from a second UE. The UE can include a mobile device, a vehicle, or a drone.

In step 610, the processor can exchange between the first UE and the second UE a first cryptographic key and a second cryptographic key, where the first cryptographic key is associated with the first UE, and where the second cryptographic key is associated with the second UE. The cryptographic key exchange can be done according to the EAP framework.

In step 620, the processor can receive, at the first UE, a unique identifier associated with the second UE, where the unique identifier is encrypted. The unique identifier can be an international mobile subscriber identity. The unique identifier is unique to the second UE. The unique identifier can identify a second wireless telecommunication network serving the second UE.

In step 630, the processor can authenticate the second UE by sending the encrypted unique identifier to a first wireless telecommunication network and sending a request to confirm that the unique identifier is valid. The first and second wireless telecommunication networks can be the same or can be different networks.

In step 640, the processor can receive, from the first wireless telecommunication network, a confirmation that the unique identifier is valid. In step 650, upon receiving the confirmation, the processor can engage in a communication with the second UE.

The processor can increase the accuracy of authentication by using additional identification associated with the second UE. The additional identification can include a name associated with a user of the second UE, an email associated with the user of the second UE, and/or a phone number associated with the user of the second UE. The processor can send the additional identification to the first wireless telecommunication network. The first wireless telecommunication network can be configured to verify that the unique identifier is associated with the second wireless telecommunication network, that the name associated with the user of the second UE is associated with the unique identifier, that the email associated with the user of the second UE is associated with the unique identifier, and/or that the phone number associated with the user of the second UE is associated with the unique identifier.

The processor can determine from the unique identifier an identity of the second wireless telecommunication network. The processor can determine from the unique identifier a unique identifier associated with the second UE. The unique identifier associated with the second UE can be an MSIN. The processor can request from the second wireless telecommunication network a confirmation that the unique identifier associated with the second UE is a member of the second wireless telecommunication network. Upon receiving the confirmation from the second wireless telecommunication network, the processor can send the confirmation to the first UE that the unique identifier is valid.

The processor can enable hotspot sharing with various devices using various authentication methods. The processor can create, at the first UE, a Wi-Fi hotspot, extending coverage of the first wireless telecommunication network provided to the first UE to an area surrounding the first UE. The processor can receive a request from the second UE to connect to the Wi-Fi hotspot. The processor can connect the second UE to the Wi-Fi hotspot without requesting a password specific to the Wi-Fi hotspot from the second UE.

The processor can extend coverage of the network 100 by daisy chaining multiple UEs to provide coverage in a hazardous situation, such as a firefighting situation. The processor can extend coverage of the first wireless telecommunication network provided to the first UE to a first area surrounding the first UE, where the area is hazardous and has no Wi-Fi or cellular coverage. The processor can create, at the first UE, a Wi-Fi hotspot in the first area surrounding the first UE. The processor can receive a request from the second UE to connect to the Wi-Fi hotspot, and can connect the second UE to the Wi-Fi hotspot. The processor can create, at the second UE, a second Wi-Fi hotspot in a second area surrounding the second UE, thereby extending coverage of the first wireless telecommunication network provided to the first UE.

The processor can extend the coverage of a 5G network. The processor can create, at the first UE, a Wi-Fi hotspot, extending coverage of the first wireless telecommunication network provided to the first UE to an area surrounding the first UE. The first wireless telecommunication network can be a 5G wireless telecommunication network. The processor can receive a request from the second UE to access the Wi-Fi hotspot, where the second UE is configured to communicate with a lower generation of wireless communication. The processor can enable the second UE to access the 5G wireless telecommunication network, without requesting a password specific to the Wi-Fi hotspot from the second UE.

The first UE can include a first vehicle and the second UE can include a second vehicle. Upon receiving the confirmation authenticating the vehicles, the processor can enable operation of the first vehicle and the second vehicle by communicating driving information between the first vehicle and the second vehicle.

Computer System

Figure 7:
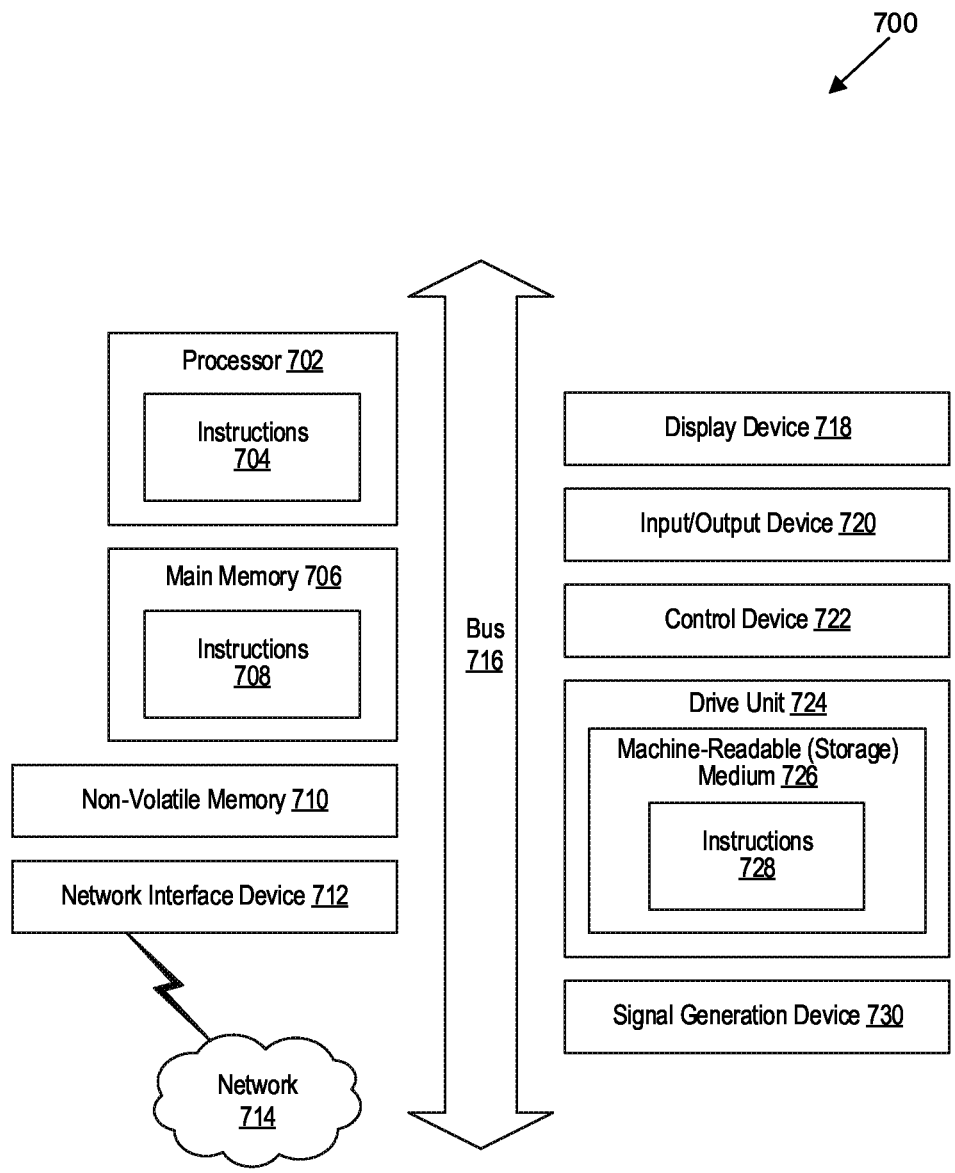
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variant thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one computer-readable storage medium, excluding transitory signals and carrying instructions to enable peer-to-peer authentication between at least two mobile devices associated with one or more wireless telecommunication networks, which, when executed by at least one data processor of a system, cause the system to:
   at a first mobile device, receive a request to communicate from a second mobile device;
   exchange between the first mobile device and the second mobile device a first cryptographic key and a second cryptographic key,
      wherein the first cryptographic key is associated with the first mobile device, and
      wherein the second cryptographic key is associated with the second mobile device;
   receive, at the first mobile device, an international mobile subscriber identity and an additional identification associated with the second mobile device,
      wherein the international mobile subscriber identity is encrypted,
      wherein the international mobile subscriber identity is unique to the second mobile device,
      wherein the international mobile subscriber identity identifies a second wireless telecommunication network serving the second mobile device
      wherein the additional identification includes a name associated with a user of the second mobile device, an email associated with the user of the second mobile device, or a phone number associated with the user of the second mobile device;
   authenticate the second mobile device by sending the encrypted international mobile subscriber identity and the additional identification to a first wireless telecommunication network and sending a request to confirm that the international mobile subscriber identity is valid,
      wherein the first wireless telecommunication network is configured to verify
         that the international mobile subscriber identity is associated with the second wireless telecommunication network, and
         that the name associated with the user of the second mobile device is associated with the international mobile subscriber identity,
         that the email associated with the user of the second mobile device is associated with the international mobile subscriber identity, or
         that the phone number associated with the user of the second mobile device is associated with the international mobile subscriber identity:
   receive, from the first wireless telecommunication network, a confirmation that the international mobile subscriber identity is valid; and
   upon receiving the confirmation, engage in a communication with the second mobile device.

2. The computer-readable storage medium of claim 1, comprising instructions to:
   determine from the international mobile subscriber identity an identity of the second wireless telecommunication network;
   determine from the international mobile subscriber identity a unique identifier associated with the second mobile device;
   request from the second wireless telecommunication network a confirmation that the unique identifier associated with the second mobile device is a member of the second wireless telecommunication network; and
   upon receiving the confirmation from the second wireless telecommunication network, send the confirmation to the first mobile device that the international mobile subscriber identity is valid.

3. The computer-readable storage medium of claim 1, comprising instructions to:
   create, at the first mobile device, a Wi-Fi hotspot, extending coverage of the first wireless telecommunication network provided to the first mobile device to an area surrounding the first mobile device;
   receive the request from the second mobile device to connect to the Wi-Fi hotspot; and
   connect the second mobile device to the Wi-Fi hotspot without requesting a password specific to the Wi-Fi hotspot from the second mobile device.

4. The computer-readable storage medium of claim 1, comprising instructions to:
   extend coverage of the first wireless telecommunication network provided to the first mobile device to a first area surrounding the first mobile device, wherein an area is hazardous and has no Wi-Fi or cellular coverage by:
      creating, at the first mobile device, a Wi-Fi hotspot in the first area surrounding the first mobile device;
      receiving the request from the second mobile device to connect to the Wi-Fi hotspot;
      connecting the second mobile device to the Wi-Fi hotspot; and
      creating, at the second mobile device, a second Wi-Fi hotspot in a second area surrounding the second mobile device, thereby extending the coverage of the first wireless telecommunication network provided to the first mobile device.

5. The computer-readable storage medium of claim 1, comprising instructions to:
- create, at the first mobile device, a Wi-Fi hotspot, extending coverage of the first wireless telecommunication network provided to the first mobile device to an area surrounding the first mobile device,
  - wherein the first wireless telecommunication network is a 5G wireless telecommunication network;
- receive the request from the second mobile device to access the Wi-Fi hotspot,
  - wherein the second mobile device is configured to communicate with a lower generation of wireless communication; and
- enable the second mobile device to access the 5G wireless telecommunication network.

6. A system comprising:
- at least one hardware processor; and
- at least one non-transitory memory storing instructions, which, when executed by the at least one hardware processor, cause the system to:
  - at a first UE, receive a request to communicate from a second UE;
  - at the first UE, provide to the second UE a first cryptographic key;
  - at the first UE, receive from the second UE a second cryptographic key,
    - wherein the first cryptographic key is associated with the first UE, and
    - wherein the second cryptographic key is associated with the second UE;
  - receive, at the first UE, a unique identifier and an additional identification associated with the second UE,
    - wherein the additional identification includes a name associated with a user of the second mobile device, an email associated with the user of the second mobile device, or a phone number associated with the user of the second mobile device,
    - wherein the unique identifier is encrypted,
    - wherein the unique identifier is unique to the second UE, and
    - wherein the unique identifier identifies a second wireless telecommunication network serving the second UE;
  - authenticate the second UE by sending the encrypted unique identifier and the additional identification to a first wireless telecommunication network and sending a request to confirm that the unique identifier is valid,
    - wherein the first wireless telecommunication network is configured to verify
      - that the unique identifier is associated with the second wireless telecommunication network, and
      - that the name associated with the user of the second mobile device is associated with the unique identifier,
      - that the email associated with the user of the second mobile device is associated with the unique identifier, or
      - that the phone number associated with the user of the second mobile device is associated with the unique identifier;
  - receive, from the first wireless telecommunication network, a confirmation that the unique identifier is valid; and
  - upon receiving the confirmation, engage in a communication with the second UE.

7. The system of claim 6, comprising instructions to:
- increase accuracy of the authentication by receiving additional identification associated with the second UE,
  - wherein the additional identification includes a name associated with a user of the second UE, an email associated with the user of the second UE, or a phone number associated with the user of the second UE; and
- send the additional identification to the first wireless telecommunication network,
  - wherein the first wireless telecommunication network is configured to verify
    - that the unique identifier is associated with the second wireless telecommunication network, and
    - that the name associated with the user of the second UE is associated with the unique identifier,
    - that the email associated with the user of the second UE is associated with the unique identifier, or
    - that the phone number associated with the user of the second UE is associated with the unique identifier.

8. The system of claim 6, comprising instructions to:
- determine from the unique identifier an identity of the second wireless telecommunication network;
- determine from the unique identifier a unique identifier associated with the second UE;
- request from the second wireless telecommunication network a confirmation that the unique identifier associated with the second UE is a member of the second wireless telecommunication network; and
- upon receiving the confirmation from the second wireless telecommunication network, send the confirmation to the first UE that the unique identifier is valid.

9. The system of claim 6, comprising instructions to:
- create, at the first UE, a Wi-Fi hotspot, extending coverage of the first wireless telecommunication network provided to the first UE to an area surrounding the first UE;
- receive the request from the second UE to connect to the Wi-Fi hotspot; and
- connect the second UE to the Wi-Fi hotspot without requesting a password specific to the Wi-Fi hotspot from the second UE.

10. The system of claim 6, comprising instructions to:
- extend coverage of the first wireless telecommunication network provided to the first UE to a first area surrounding the first UE, wherein an area is hazardous and has no Wi-Fi or cellular coverage by:
  - creating, at the first UE, a Wi-Fi hotspot in the first area surrounding the first UE;
  - receiving the request from the second UE to connect to the Wi-Fi hotspot;
  - connecting the second UE to the Wi-Fi hotspot; and
  - creating, at the second UE, a second Wi-Fi hotspot in a second area surrounding the second UE, thereby extending the coverage of the first wireless telecommunication network provided to the first UE.

11. The system of claim 6, comprising instructions to:
- create, at the first UE, a Wi-Fi hotspot, extending coverage of the first wireless telecommunication network provided to the first UE to an area surrounding the first UE,
  - wherein the first wireless telecommunication network is a 5G wireless telecommunication network;
- receive the request from the second UE to access the Wi-Fi hotspot, wherein the second UE is configured to communicate with a lower generation of wireless communication; and enable the second UE to access the 5G wireless telecommunication network.

12. The system of claim 6, wherein the first UE includes a mobile device, a vehicle, or a drone.

13. The system of claim 6, wherein the first UE includes a first vehicle and the second UE includes a second vehicle, the instructions comprising instructions to:

upon receiving the confirmation, enable operation of the first vehicle and the second vehicle by communicating driving information between the first vehicle and the second vehicle.

* * * * *